(12) United States Patent
Liao et al.

(10) Patent No.: US 9,929,592 B2
(45) Date of Patent: Mar. 27, 2018

(54) UPS SENSITIVITY OF POWER STATUS PARAMETER ADJUSTMENT SETTING METHOD

(71) Applicant: CYBERPOWER SYSTEMS, INC., Taipei (TW)

(72) Inventors: Chun-Chao Liao, Taipei (TW); Chao-Ching Yang, Taipei (TW); Hsien-Hsun Liu, Taipei (TW)

(73) Assignee: Cyberpower Systems, Inc., Taipei (TW)

( * ) Notice: Subject to any disclaimer, the term of this patent is extended or adjusted under 35 U.S.C. 154(b) by 391 days.

(21) Appl. No.: 14/848,823

(22) Filed: Sep. 9, 2015

(65) Prior Publication Data
US 2016/0126787 A1    May 5, 2016

(30) Foreign Application Priority Data

Nov. 5, 2014   (TW) .............................. 103138395 A

(51) Int. Cl.
*H02J 9/00*     (2006.01)
*H02J 7/00*     (2006.01)
*H02J 9/06*     (2006.01)

(52) U.S. Cl.
CPC .............. *H02J 9/062* (2013.01); *H02J 9/005* (2013.01)

(58) Field of Classification Search
CPC .................................. H02J 9/005; H02J 9/062

USPC ........................................................... 307/66
See application file for complete search history.

(56) References Cited

U.S. PATENT DOCUMENTS

| 2003/0227785 | A1* | 12/2003 | Johnson, Jr. | ............... | H02J 9/06 363/37 |
| 2009/0072623 | A1* | 3/2009 | Liao | ......................... | H02J 9/061 307/65 |

* cited by examiner

*Primary Examiner* — Rexford Barnie
*Assistant Examiner* — Toan Vu
(74) *Attorney, Agent, or Firm* — Rosenberg, Klein & Lee

(57) ABSTRACT

A UPS sensitivity of power status parameter adjustment setting method used in UPS system for allowing sensitivity setting of power status parameter manually by user or according to system default value. Microcontroller can automatically switch sensitivity to HIGH to enhance power protection if power status of input power supply is judged in the range set according to option of energy-saving, electrical safety or set time in priority after completing counting time. If power generator of relatively lower power quality level is used for input power supply, microcontroller can automatically switch sensitivity to LOW subject to option of energy-saving in priority and employ a low-sensitivity detection of power judgment, maintaining USP system in normal mode without being changed to battery mode, preventing system shutdown due to complete discharge of stored energy systems, and UPS system can operate normally, and power supply of stored energy systems can be prolonged and well-protected.

8 Claims, 11 Drawing Sheets

UPS SENSITIVITY OF POWER STATUS PARAMETER ADJUSTMENT SETTING METHOD

This application claims the priority benefit of Taiwan patent application number 103138395, filed on Nov. 5, 2014.

BACKGROUND OF THE INVENTION

1. Field of the Invention

The present invention relates to UPS (Uninterruptible Power Supply) technology and more particularly, to a UPS sensitivity of power status parameter adjustment setting method, which enables the UPS system to automatically switch the sensitivity according to the selected option of energy saving in priority, electrical safety in priority or set time in priority, avoiding system shutdown due to power low of the stored energy systems in the period of poor input power supply, thereby ensuring the normal operation of the UPS system.

2. Description of the Related Art

Following the development of modern electronic technology in a rapid rate of growth, there is now a clear trend in computer science towards high performance computing capabilities, high speed and small size. Because many electronic apparatuses and equipments use a computer to control their actions or executive functions, computer therefore occupies a very important position in various industries. As the processing speed and performance of modern computers and servers have been greatly improved, the data storage capacity of memory means in the host computer, server chassis, data storage cabinet or telecommunication cabinet shall be relatively increased for storing more data. Taking into account the stability of the overall system and the problem that interruption of power can cause component damage, lifespan shortening and data loss, the supplying quality of power supply will be even more important.

Further, in order to effectively solve the aforesaid power supply problem, it is the common way to use a UPS system for providing electricity immediately upon interruption of power supply. A UPS system can conduct the functions of voltage stabilization, removal of surge and noise and lightning protection, providing stable and clean power to a computer, server, network equipment, security system, medical equipment, data storage center, industrial equipment for normal functioning without causing damage or paralysis. UPS systems can be categorized into Off-Line, On-Line and Line-Interactive types. When the AC mains or AC power supply is normally provided, the microcontroller of the UPS system controls a transfer switch to switch the load to bypass for enabling inputted AC mains or AC power supply to be directly delivered to the load, or to switch the load to an inverter for enabling DC battery power to be converted into stabilized AC power supply for output to the load. On the other hand, a battery charger or the inverter can used for converting the inputted AC mains or AC power supply into DC power supply for charging the battery so that the battery can provide power supply in case of a power interruption. If the input power supply is not normal, the transfer switch will switch the load to the inverter, enabling the inverter to convert the DC battery power supply into stabilized AC power supply for the load, achieving the effect of uninterruptible power supply.

However, every UPS system commonly has a plurality of loads connected to the output end thereof, and will continuously conduct the uninterruptible power supply function during the operation of the loads. If the voltage or current of the inputted AC mains or AC power supply becomes unstable, the rectifying circuit, power correction circuit or filter circuit of the normal mode main loop will conduct a rectification process to provide stable and clean power supply to the loads. If the input of the AC mains or AC power supply is normal, the UPS system will be switched to the ECO Mode, enabling the inputted AC mains or AC power supply AC mains to be directly delivered through the bypass to the loads without through the main loop, reducing power conversion loss and enhancing the effect of energy saving. Under different load characteristics and operating conditions, the power loss of the load operating mode or standby mode varies widely. Under the ECO Mode, the aforesaid UPS system can achieve the energy saving effect, however, the load power protection effect of the UPS system during operation is poor, lowering electrical safety. If the USP system is set to provide AC power supply to the loads in the normal mode under the option that electrical safety is in the priority, the loads cannot achieve the effects of energy saving under the standby mode.

Further, under different load characteristics and operating conditions, the power loss of a UPS system varies with operating mode or standby mode. Some USP systems allow adjustment of the sensitivity of input power (such as voltage) so that when the quality of input power is good, the user can manually set the sensitivity to be HIGH, increasing the sensitivity of voltage distortion. Further, if the input power supply surpasses the range of the set sensitivity, these designs of UPS systems can use battery mode to provide power supply. However, because the level of power protection is enhanced, the chance that the UPS system enters the battery mode is relatively increased, and the system can be shut down if the power of the battery is completely discharged. Further, because the battery must be recharged when the battery power is low, power loss is relatively increased. On the contrary, when the sensitivity is switched to LOW, the sensitivity of voltage distortion is relatively lowered, and thus, the effect of energy-saving is enhanced although the level of electrical safety is lowered.

However, when the quality of the input power supply of the UPS system is good, the user can manually switch the sensitivity to HIGH, and the USP system will switch to the battery mode if an abnormality of the input power supply occurs or the input power supply fails. If the user uses a power generator of a relatively lower power quality for power input, the UPS system will keep in a high sensitivity state to continuously employ a high-sensitivity detection of power judgment method, unable to allow automatic switching of power sensitivity selection function between the mode of energy-saving in priority and the mode of electrical safety in priority. In this case, the UPS system is constantly maintained in the battery mode, and will be shut down when the battery is completely discharged. An improvement in this regard is desired.

SUMMARY OF THE INVENTION

The present invention has been accomplished under the circumstances in view. It is therefore the primary object of the present invention to provide a UPS sensitivity of power status parameter adjustment setting method for use in a UPS system, which allows setting of the sensitivity of the power status parameter manually by the user or according to the system default value, so that the microcontroller of the UPS system can automatically switch the sensitivity to HIGH to enhance power protection if the power status of the input power supply is judged in the range set according to option of energy-saving, electrical safety or set time in priority after counting of the set time is completed. If a power generator of a relatively lower power quality level is used for the input power supply, the microcontroller can automatically switch the sensitivity to LOW subject to the option of energy-saving in priority and employ a low-sensitivity detection of power judgment, maintaining the USP system in the normal mode without being changed to the battery mode, preventing system shutdown due to complete discharge of the stored energy systems, and thus, the UPS system can operate normally, and the supply of the power of the stored energy systems to the load can be prolonged and well protected.

Further, when the setting of automatic switching is made according to the option of energy-saving in priority, the microcontroller of the UPS system can judge the power status parameter of the input power supply, and start counting the set time. If the microcontroller judges that the current sensitivity set value is MEDIUM and sequentially judges the power status parameter of the input power supply is within the range of MEDIUM and the range of HIGH, the microcontroller will keep counting time and will then automatically switch the sensitivity to HIGH and reset the counting time to zero when the set time is up. If the microcontroller judges the power status parameter of the input power supply is not in conformity with the sensitivity set range of MEDIUM, the microcontroller will automatically switch the sensitivity to LOW. If the microcontroller judges that the current sensitivity set value is LOW and the power status parameter of the input power supply is within the range of MEDIUM, the microcontroller will keep counting time, and will then automatically switch the sensitivity to MEDIUM when the set time is up. Further, if microcontroller judges that the current sensitivity set value is not LOW and the power status parameter of the input power supply is out of the range of MEDIUM, the microcontroller will immediately switch the sensitivity to LOW. If microcontroller judges that the power status parameter of the input power supply is within the range of MEDIUM, the microcontroller will judge whether or not the power status parameter of the input power supply in the range of HIGH, and will immediately switch the sensitivity to MEDIUM if the power status parameter of the input power supply is not in the range of HIGH. At final, the microcontroller will reset the counting time to zero and then end the procedure, finishing the setting of switching according to the option of energy-saving in priority.

Further, when the setting of automatic switching is made according to the option of electrical safety in priority, the microcontroller of the UPS system can judge the power status parameter of the input power supply, and set the demanded value for the sensitivity state to be electrical safety. After setting, the sensitivity state is automatically changed to the demanded value of electrical safety. Thereafter, the microcontroller starts counting the set time and then automatically switches the sensitivity when the set time is up. If the microcontroller judges that the current status of the power status parameter of the input power supply is out of the set range of MEDIUM, the microcontroller will immediately switch the sensitivity setting to HIGH. If the microcontroller judges that the current status of the power status parameter of the input power supply is in the set range of MEDIUM and the demanded sensitivity set value it not MEDIUM, the microcontroller will keep counting time, and will automatically switch the sensitivity to LOW when the set time is up. If the microcontroller judges that the current state is LOW and the power status parameter of the input power supply is out of the range of the sensitivity of LOW, the microcontroller will automatically switch the sensitivity to MEDIUM. If the microcontroller judges that the current state is neither MEDIUM nor LOW, and the power status parameter of the input power supply is within the range of the sensitivity of HIGH, the microcontroller will then judge whether or not the demanded set value to be the sensitivity of HIGH. If the demanded set value is not the sensitivity of HIGH, the microcontroller will automatically switch the sensitivity to MEDIUM when the set time is up. Thereafter, the microcontroller will reset the counting time to zero and then end the procedure, finishing the setting of switching according to the option of electrical safety in priority.

Further, when the setting of automatic switching is made according to the option of set time in priority, the microcontroller of the UPS system can judge the power status parameter of the input power supply, and then start counting the set time. If the microcontroller judges that the power status parameter of the input power supply enters the action time range of the sensitivity of HIGH, the microcontroller will automatically switch the setting of sensitivity to HIGH. If the microcontroller judges that the power status parameter of the input power supply does not enter the action time range of the sensitivity of HIGH, the microcontroller will then judge whether or not the power status parameter of the input power supply enters the action time range of the sensitivity of MEDIUM. If the power status parameter of the input power supply enters the action time range action time range of the sensitivity of MEDIUM, the microcontroller will automatically switch the setting of sensitivity to MEDIUM. If the power status parameter of the input power supply enters the action time range of the sensitivity of MEDIUM at this time, the microcontroller will judge whether or not the power status parameter of the input power supply enter the action time range of the sensitivity of LOW. If the power status parameter of the input power supply enters the action time range of the sensitivity of LOW at this time, the microcontroller will automatically switch the setting of sensitivity to LOW. Thereafter, the microcontroller will reset the counting time to zero and then end the procedure, finishing the setting of switching according to the option of set time in priority.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
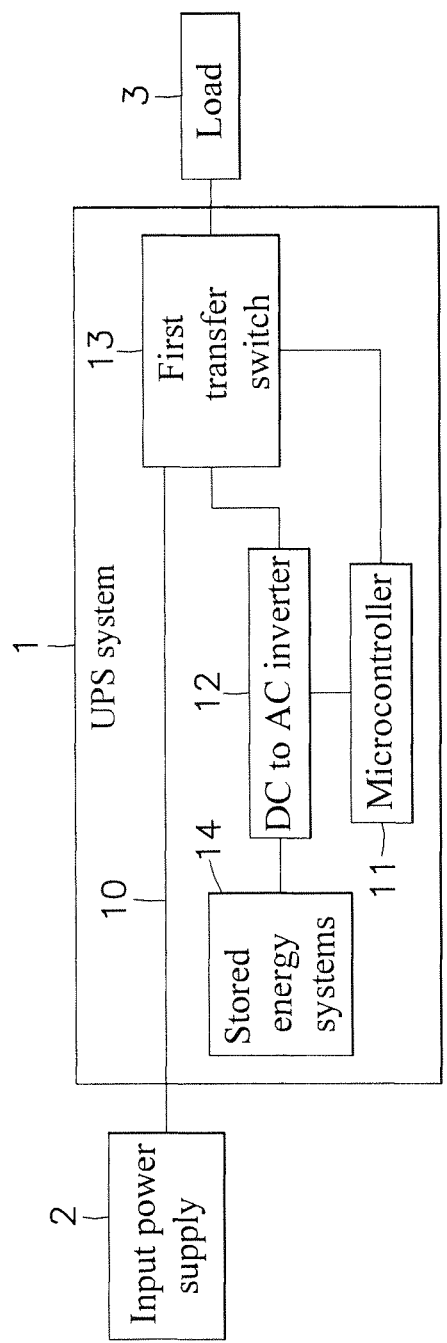
FIG. 1 is a circuit block diagram illustrating a UPS system with a power input end thereof connected to an input power supply and a power output end thereof connected to an load in accordance with the present invention.

Referring to FIGS. 1-6, a UPS sensitivity of power status parameter adjustment setting method in accordance with the present invention is used in a UPS (Uninterruptible Power Supply) system 1 that has its power input end connected to an input power supply 2, and its power output end connected to at least one load 3. The USP system 1 comprises a microcontroller 11, a DC-to-AC inverter 12 electrically coupled to the microcontroller 11, a first transfer switch 13 made in the form of, for example, a relay or static transfer switch (STS) and electrically connected to the microcontroller 11 and electrically coupled with the DC-to-AC inverter 12, the input power supply 2 and the at least one load 3, and stored energy systems 14 electrically coupled to the DC-to-AC inverter 12. The circuit block diagram shown in FIG. 1 constitutes an Off-Line UPS system. When the UPS system 1 is in the normal mode, the input power supply 2 can directly provide AC output through a bypass 10 to the at least one load 3, and the DC-to-AC inverter 12 can convert the AC input power supply 2 into DC power supply for charging the stored energy systems 14. When an abnormal states occurs (such as excessive LOW or HIGH voltage over a certain period of time), the microcontroller 11 will control the first transfer switch 13 to switch to the DC-to-AC inverter 12, causing the DC-to-AC inverter 12 to convert the DC power supply of the stored energy systems 14 into AC power supply for output to the at least one load 3, enhancing electrical safety.

Figure 2:
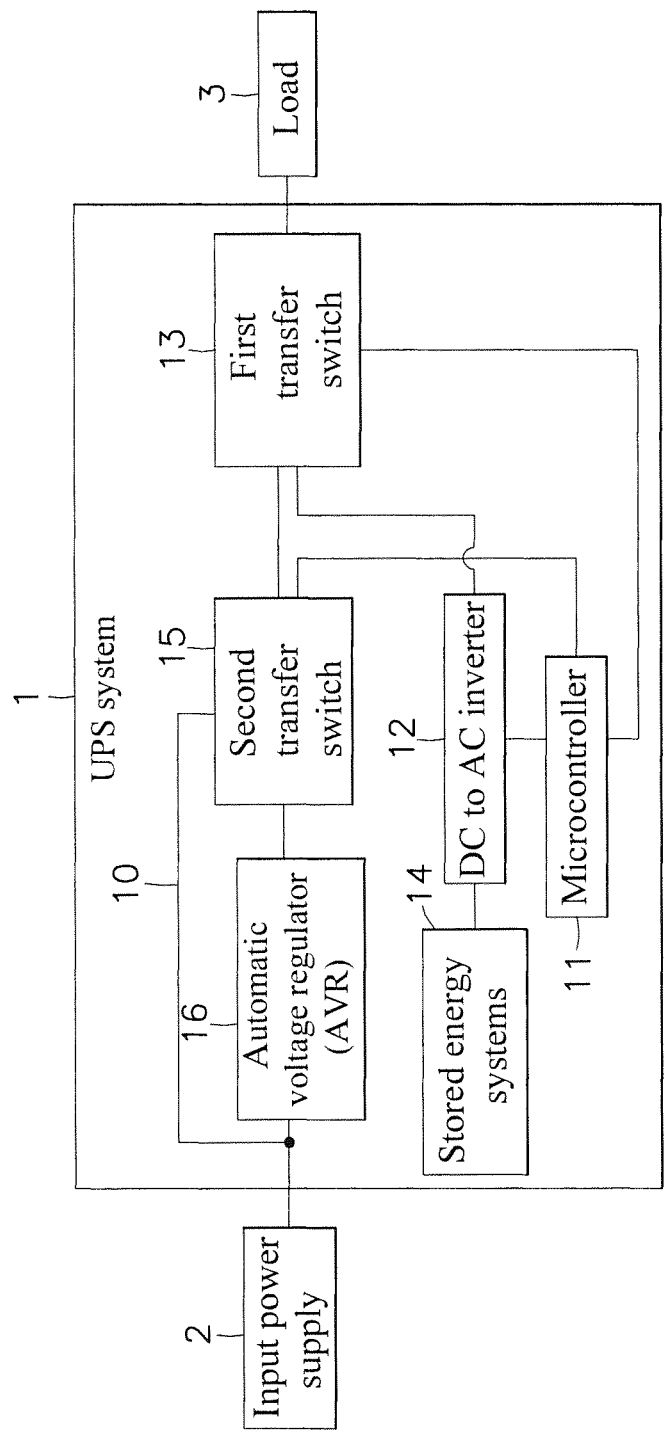
FIG. 2 illustrates an alternate form of the circuit block diagram of the UPS system in accordance with the present invention.

Further, the UPS system 1 can be configured subject to a line-interactive design. In one example of the line-interactive design, as shown in FIG. 2, the UPS system 1 further comprises a second transfer switch 15 electrically coupled to the microcontroller 11, the first transfer switch 13 and the input power supply 2, and an automatic voltage regulator (AVR) 16 electrically connected to the second transfer switch 15 and electrically coupled to the input power supply 2. Thus, when the UPS system 1 is in the normal mode, the microcontroller 11 will control the second transfer switch 15 to switch the AC input power supply 2 to the automatic voltage regulator 16, causing the automatic voltage regulator 16 to buck (decrease) or boost (increase) the AC input power supply 2 into stabilized AC output power supply to the at least one load 3. If an abnormal state occurs, the microcontroller 11 will control the second transfer switch 15 to switch to the DC-to-AC inverter 12, causing the DC-to-AC inverter 12 to convert the battery power of the stored energy systems 14 into AC output power supply to the at least one load 3, enhancing electrical safety, and thus, the necessary working power supply can be continuously provided to the at least one load 3 even if the AC input power supply 2 is interrupted. When the UPS system 1 is in the energy-saving mode or ECO mode, the microcontroller 11 will control the second transfer switch 15 to switch to the bypass 10, enabling the AC input power supply 2 to be directly transmitted to the at least one load 3, reducing power loss, and thus, enhancing the efficiency of the UPS system 1 in power consumption and achieving the effect of energy saving.

Figure 3:
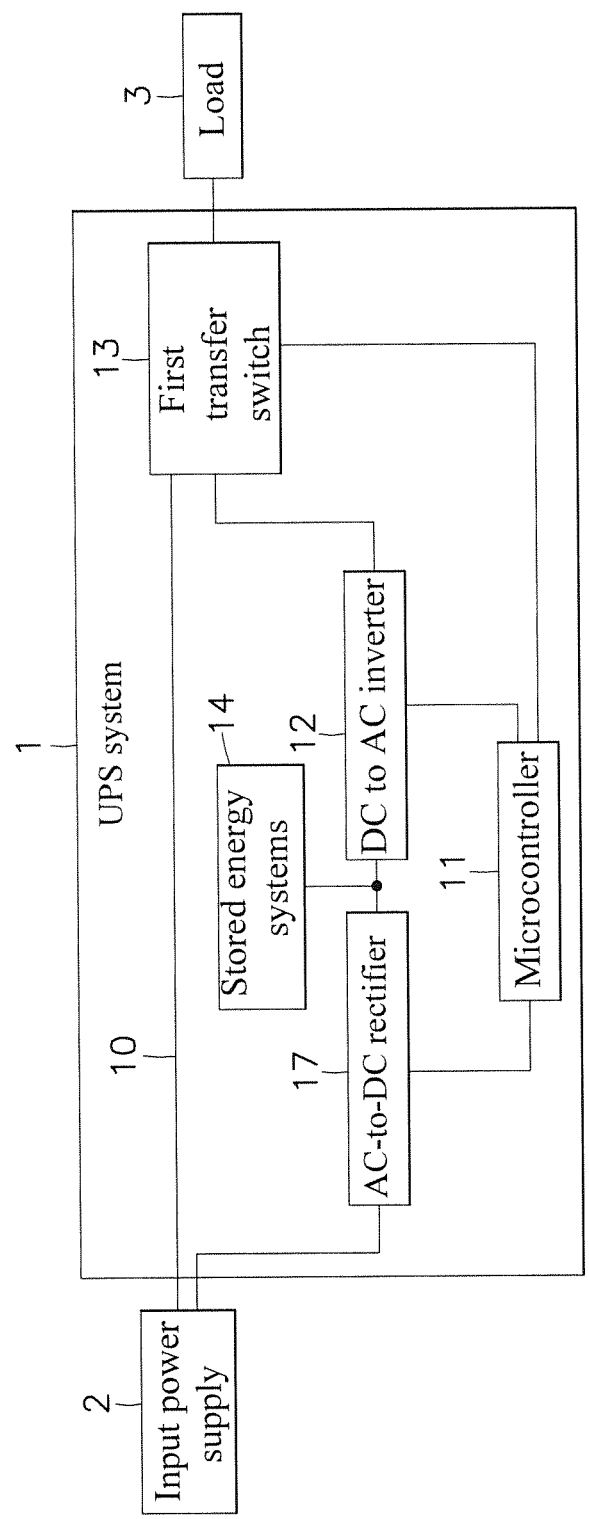
FIG. 3 illustrates another alternate form of the circuit block diagram of the UPS system in accordance with the present invention.
Figure 4:
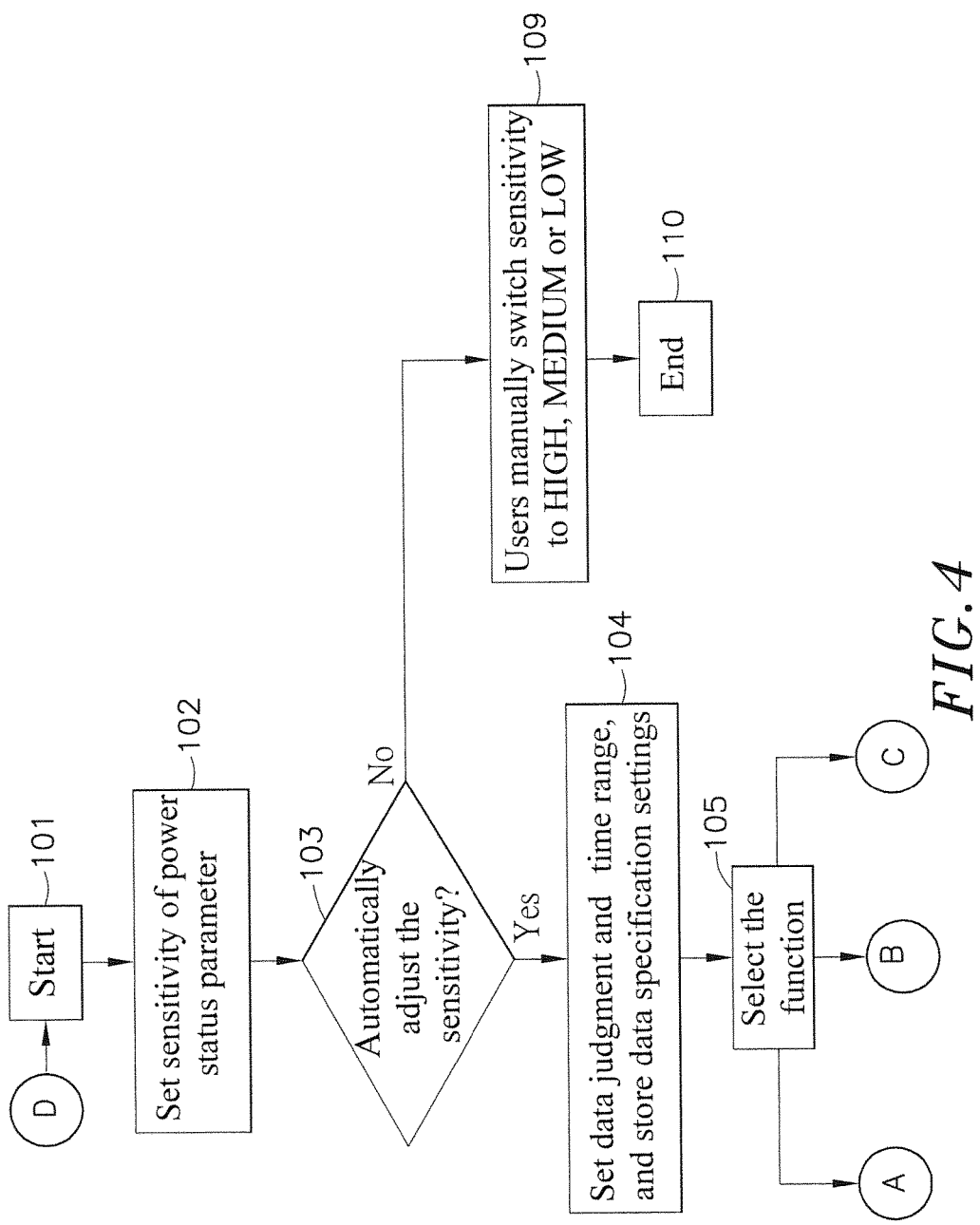
FIG. 4 is a flow chart illustrating a UPS sensitivity of power status parameter adjustment setting method in accordance with the present invention (I).
Figure 5:
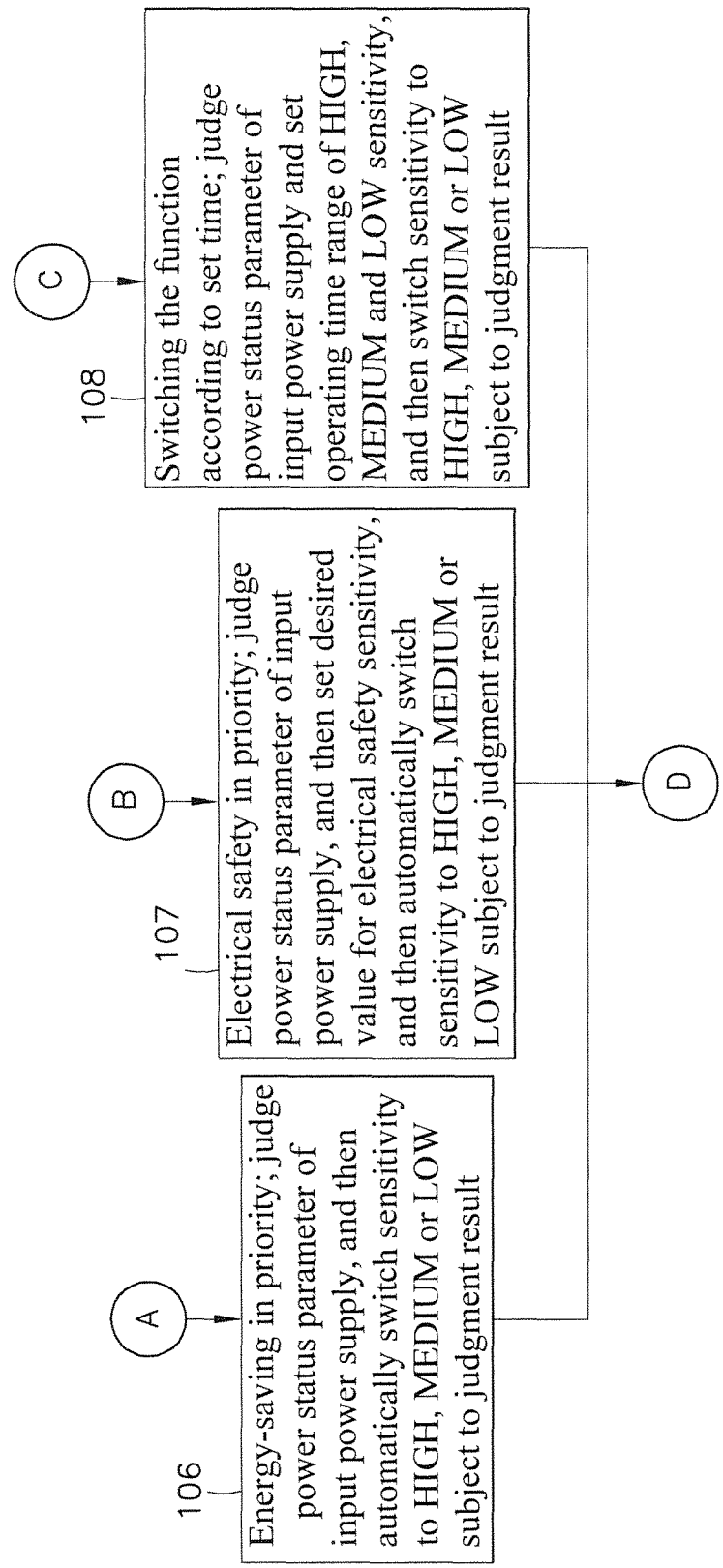
FIG. 5 is a flow chart illustrating a UPS sensitivity of power status parameter adjustment setting method in accordance with the present invention (II).
Figure 6:
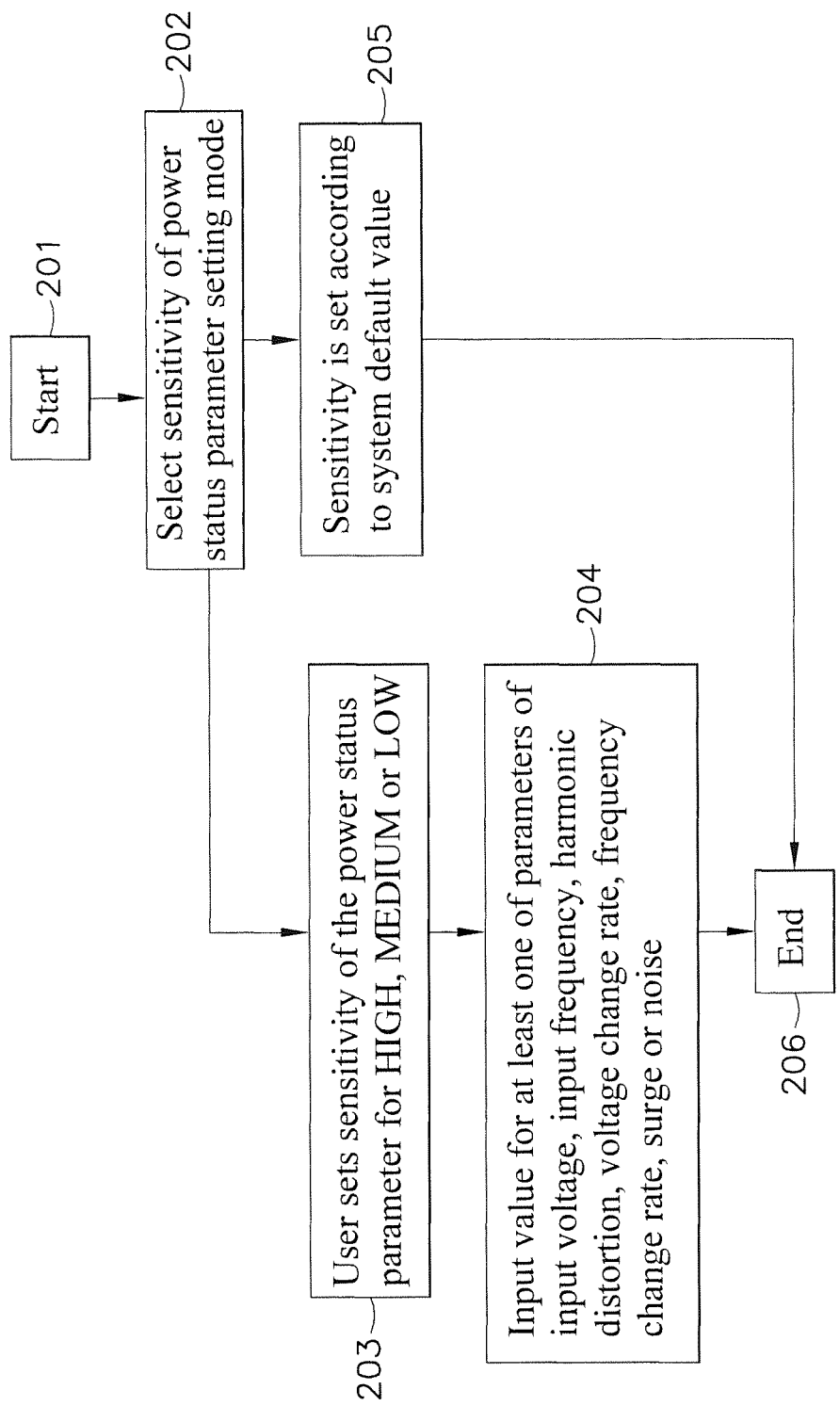
FIG. 6 is a flow chart of the sensitivity of power status parameter setting method in accordance with the present invention.
Figure 7:
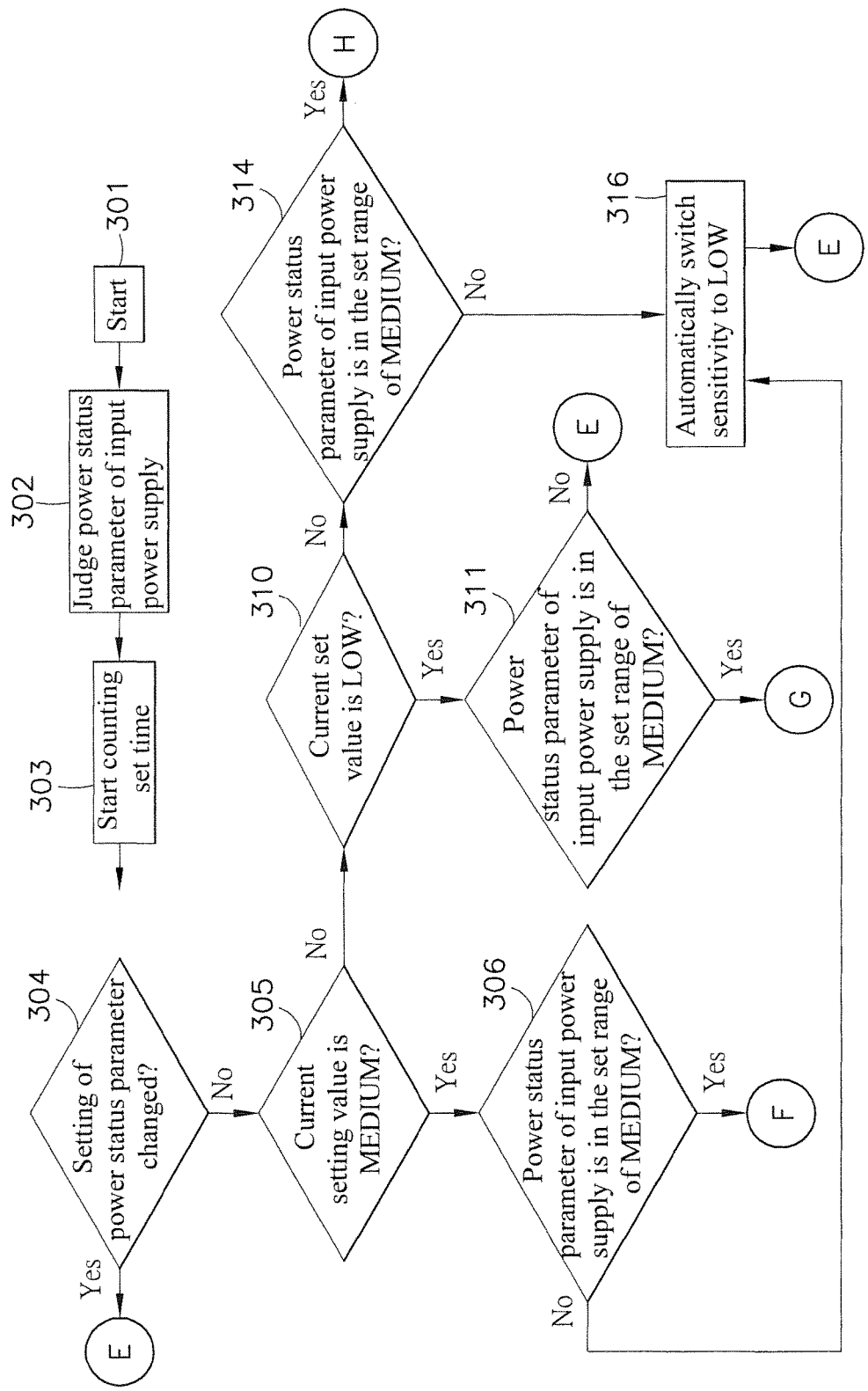
FIG. 7 is a flow chart of automatic switching with energy-saving in priority (I).
Figure 8:
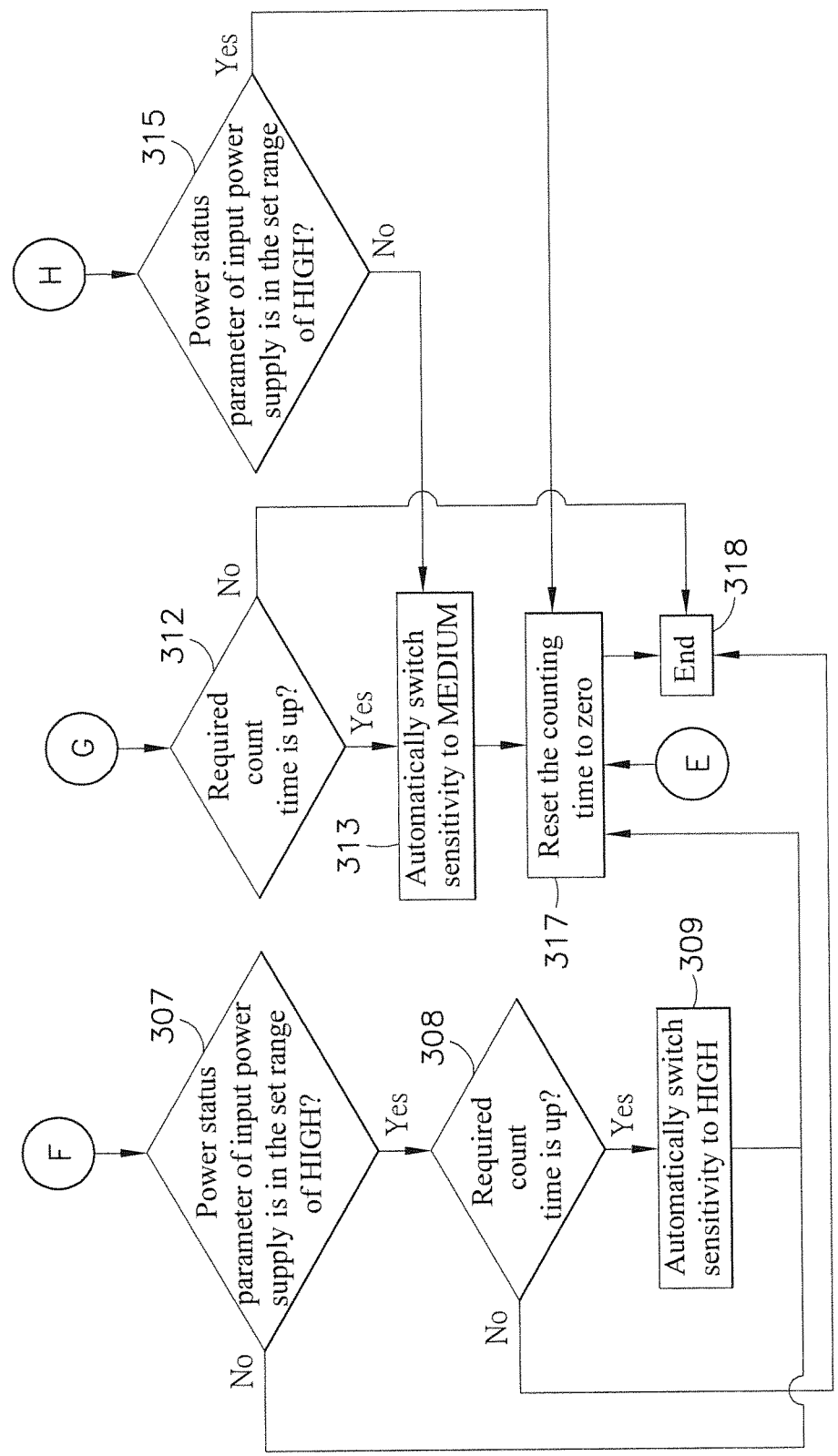
FIG. 8 is a flow chart of automatic switching with energy-saving in priority (II).
Figure 9:
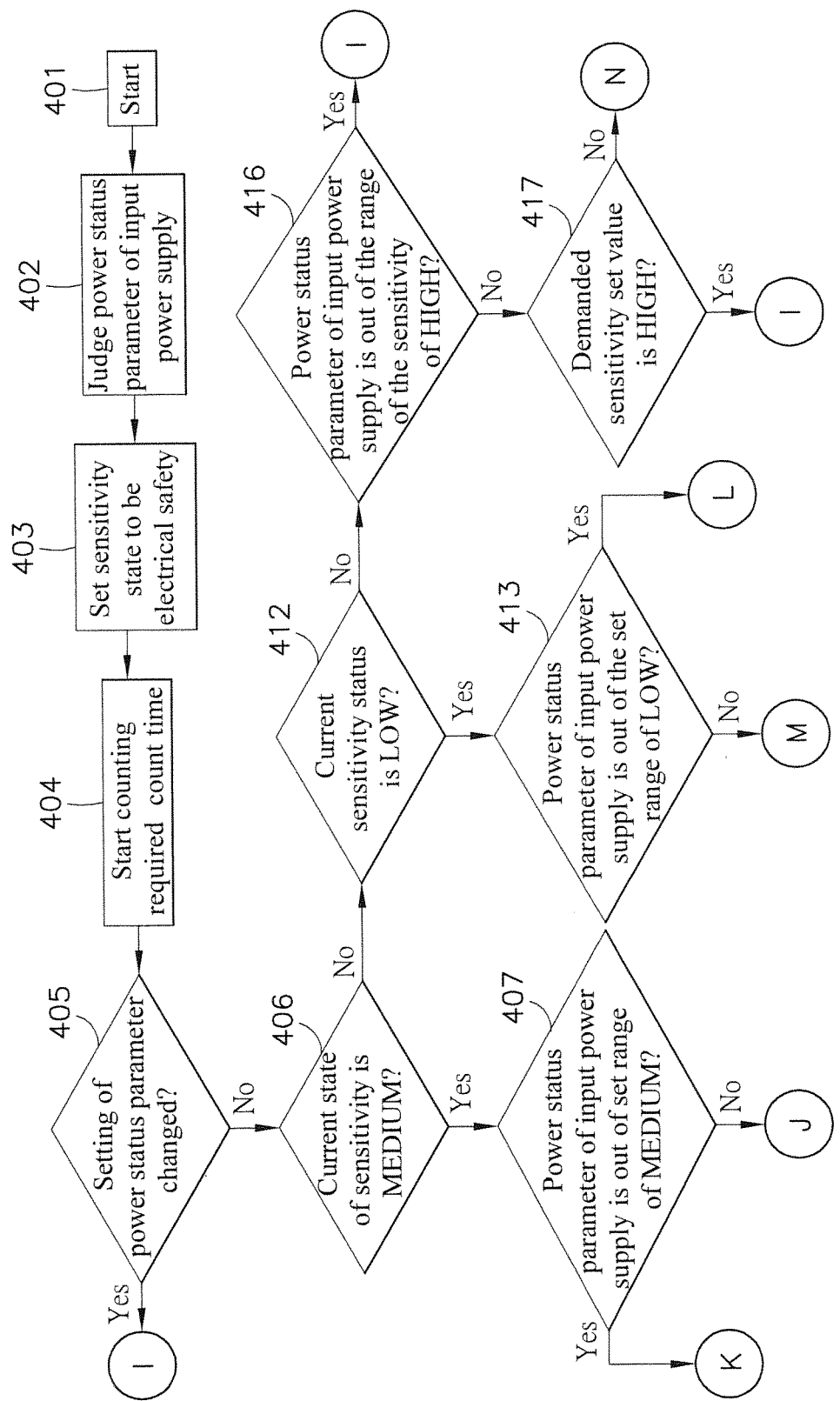
FIG. 9 is a flow chart of automatic switching with electrical safety in priority (I).
Figure 10:
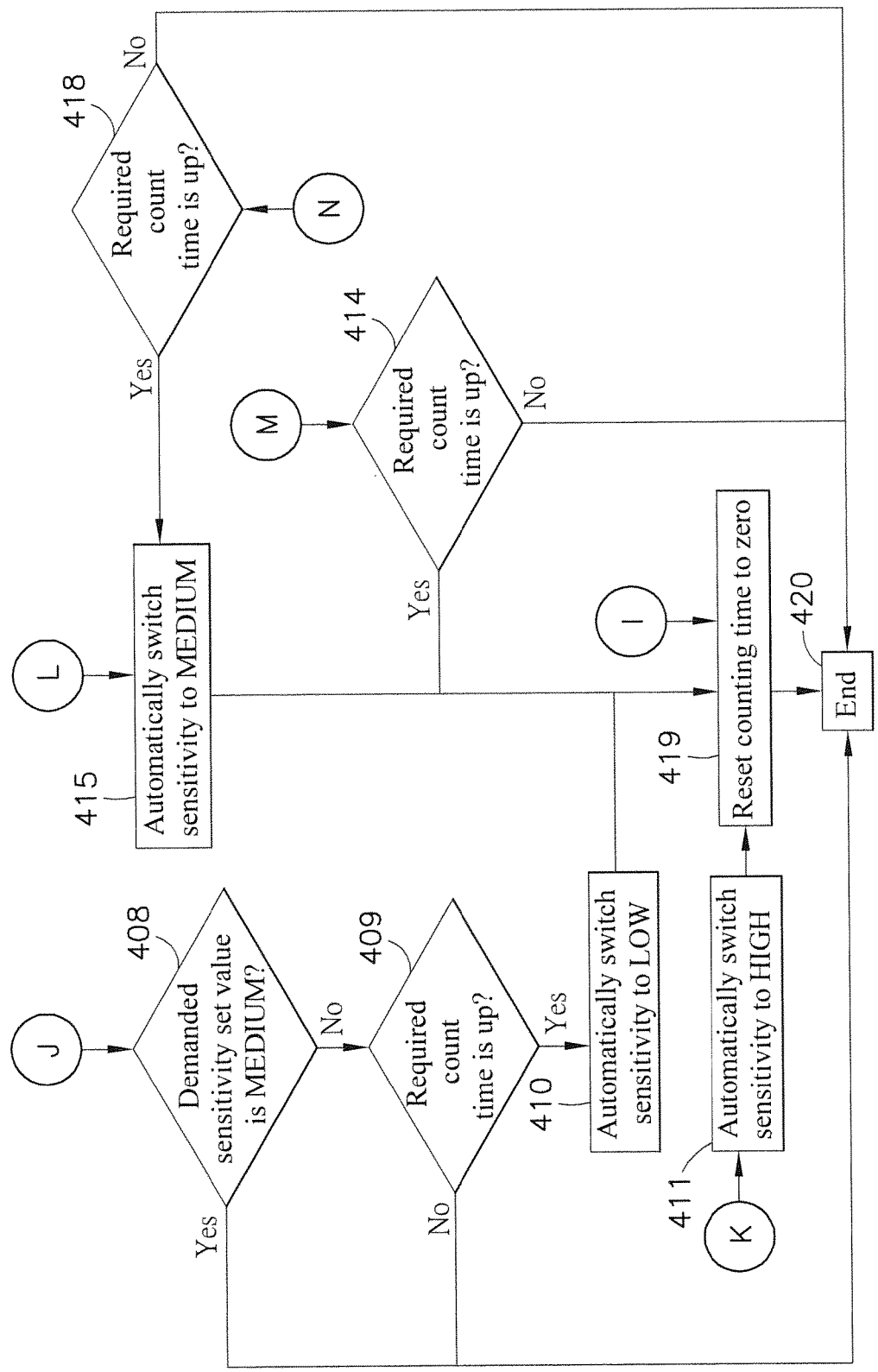
FIG. 10 is a flow chart of automatic switching with electrical safety in priority (II).
Figure 11:
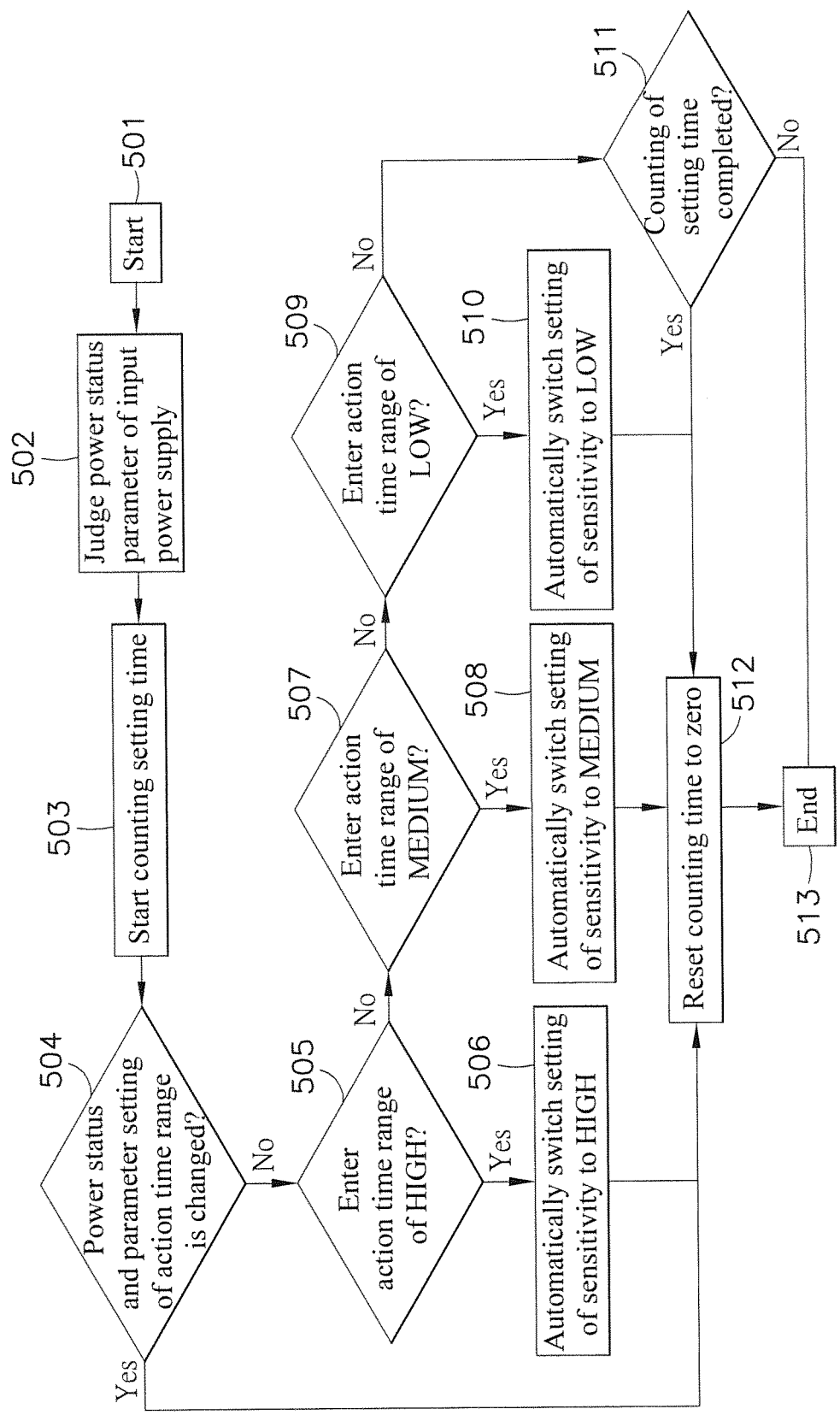
FIG. 11 is a flow chart of automatic switching according to set time.

In an on-line UPS system design, as shown in FIG. 3, the UPS system 1, based on the off-line design shown in FIG. 1, further comprises an AC-to-DC rectifier 17 electrically connected to the microcontroller 11 and the DC-to-AC inverter 12, and electrically coupled with the input power supply 2. In this design, the stored energy systems 14 is electrically connected to the midpoint of the circuit between the AC-to-DC rectifier 17 and the DC-to-AC inverter 12. When the UPS system 1 is in the normal mode, the microcontroller 11 will control the AC-to-DC rectifier 17 to rectify the AC input power supply 2 into DC power supply for charging the stored energy systems 14 by the AC-to-DC rectifier 17 or by means of a charger (not shown), enabling the DC-to-AC inverter 12 t o convert DC power supply into stabilized AC power supply for output to the at least one load 3 so as to enhance electrical safety. If an abnormal state occurs, the microcontroller 11 will control the first transfer switch 13 to switch to the DC-to-AC inverter 12, causing the DC-to-AC inverter 12 to convert the DC power supply of the stored energy systems 14 into AC power supply for output to the at least one load 3, and thus, power supply can be continuously provided to the at least one load 3 without interruption. When the UPS system 1 is in the energy-saving mode or ECO mode, the microcontroller 11 will control the first transfer switch 13 to switch to the bypass 10, enabling the AC input power supply 2 to be directly outputted to the at least one load 3, and thus, this operating mode can effectively reduce power loss, enhance the efficiency of the UPS system 1 in power consumption and achieve the effect of energy saving.

Further, the UPS system 1 can be connected to a proximal or distal control system (not shown), enabling the proximal or distal control system to monitor the operating status of the UPS system 1 through an operating system or web interface, facilitating setting operation. Further, the circuit application and conversion circuit design of the UPS system 1 can be variously embodied to meet different application requirements or to match with different load 3 for off-line, on-line or line-interactive applications. Further, multiple loads 3 can be connected to the output terminal of the first transfer switch 13 of the UPS system 1. Further, the load 3 can be a monitor, personal computer, server, etc.

The UPS sensitivity of power status parameter adjustment setting method comprises the steps of:

(101) Start.

(102) Set the sensitivity of power status parameter.

(103) Judge whether or not to automatically adjust the sensitivity. And then proceed to step (104) if positive, or step (109) if negative.

(104) Set data judgment and time range, and store data specification settings.

(105) Select the function, and then proceed to step (106) if energy-saving in priority is selected, step (107) if electrical safety in priority is selected, or step (108) if the option of switching the function according to the set time is selected.

(106) Energy-saving in priority is selected; thus, conduct judgment of the power status parameter of the input power supply 2, and then automatically switch the sensitivity to HIGH, MEDIUM or LOW subject to the judgment result, and then return to step (101).

(107) Electrical safety in priority is selected; conduct judgment of the power status parameter of the input power supply 2, and then set the desired value for the electrical safety sensitivity, and then automatically switch the sensitivity to HIGH, MEDIUM or LOW subject to the judgment result, and then return to step (101).

(108) The option of switching the function according to the set time is selected; conduct judgment of the power status parameter of the input power supply 2 and set the operating time range of HIGH, MEDIUM and LOW sensitivity, and then switch the sensitivity to HIGH, MEDIUM or LOW subject to the judgment result, and then return to step (101).

(109) Manually switch the sensitivity to HIGH, MEDIUM or LOW.

(110) End the procedure.

It is clear from the above that in the application of the UPS sensitivity of power status parameter adjustment setting method of the present invention, the microcontroller 11 of the UPS system 1 determines whether or not to automatically adjust the sensitivity. If not to automatically adjust the sensitivity, the user can manually switch the sensitivity to HIGH, MEDIUM or LOW. If to automatically adjust the sensitivity, the microcontroller 11 can then automatically adjust the sensitivity. At this time, the microcontroller 11 works with the control system (not shown) to collect electric power environment data and relevant power usage status data of the load 3 and to conduct statistical analyses on the collected data, and then to make a judgment and to set the desired time range, wherein the time range can be 30 minutes, one hour, 12 hours, one day, one week, or other desired time period. After time setting, the microcontroller 11 will store the data specification setting in a memory, and will then select the option that energy-saving in priority, electrical safety in priority, or switching the function according to the set time. After selection of the functional options, it is to set the demanded electrical safety sensitivity value, or the action time range for the sensitivity level of HIGH, MEDIUM or LOW. Thereafter, the microcontroller 11 will make a judgment on the input voltage, input frequency, harmonic distortion, voltage change rate, frequency change rate, surges, noises or other power status parameters of the input power supply 2, and will then select the options according to the option that energy saving, electrical safety or set time is in priority. If the judgment result made by the microcontroller 11 confirms that the AC input power supply 2 is within the sensitivity of power status parameter set range, the microcontroller 11 will automatically switch the sensitivity to HIGH, MEDIUM or LOW. This sensitivity of power status parameter automatic setting procedure can repeatedly implement steps (101)~(108) to repeatedly judge the power status parameter of the input power supply, and to automatically switch the sensitivity to HIGH, MEDIUM or LOW according to the judgment result, and this automatic sensitivity adjustment procedure will not be ended unless the user change the adjustment of the sensitivity of power status parameter to the manual mode.

If the microcontroller 11 confirms that the sensitivity of the power status parameter of input power supply 2 surpasses the set range of HIGH, MEDIUM or LOW, the microcontroller 11 will control the first transfer switch 13 to switch to the DC-to-AC inverter 12 for converting the stored energy systems 14 into AC power supply for output to the loads 3 avoiding any power interruption. If the sensitivity is switched to HIGH, for the sake of electrical safety, the number of times in which the microcontroller 11 switches the DC-to-AC inverter 12 to let the stored energy systems 14 be outputted to the loads 3 is increased, thereby increasing electrical safety; on the contrary, when the sensitivity is switched to LOW, the electrical safety of the UPS system 1 is relatively lowered, however, the effect of energy saving is relatively enhanced.

Further, the aforesaid step (102) of the sensitivity of power status parameter setting method for setting the sensitivity of power status parameter comprises the sub steps of:

(201) Start.

(202) Select the sensitivity of power status parameter setting mode, and then proceed to sub step (203) if manual setting is selected, or sub step (205) if setting according to system default value is selected.

(203) The user sets the sensitivity of the power status parameter for HIGH, MEDIUM or LOW.

(204) Input the value for at least one of the parameters of input voltage, input frequency, harmonic distortion, voltage change rate, frequency change rate, surge or noise, and then proceed to sub step (206).

(205) The sensitivity is set according to the system default value.

(206) End.

It is clear from the sub steps described above that the microcontroller 11 of the UPS system 1 can set the sensitivity of the power status parameter according to the user's selection between the manual setting mode and the system default value setting mode. If the user manually sets the sensitivity of the power status parameter for HIGH, MEDIUM or LOW, the user needs to input the value for at least one of the parameter of input voltage, input frequency, harmonic distortion, voltage change rate, frequency change rate, surge or noise. If the sensitivity of the power status parameter is set according to the system default value, the input voltage can be in the range of, for example, but not limited to, 115~125V for HIGH, 110~130V for MEDIUM, and 100~140V for LOW. The specifications of the settings of the power status parameters of the input power supply can be changed to meet different application requirements, for example, for the sensitivity of HIGH, the range of the input voltage can be in the range of 115~125V, the frequency change rate can be smaller than 2 Hz/sec, the voltage change rate can be +/−10V/ms, the harmonic distortion can be smaller than 5% or the input voltage surge can be smaller than 150V; for the sensitivity of MEDIUM, the input voltage can be in the range of 110~130V or the frequency change rate can be smaller than 5 Hz/sec; for the sensitivity of LOW, the input voltage can be in the range of 100~140V.

Referring to FIGS. 7-11, a flow chart of automatic switching with energy-saving in priority (I), a flow chart of automatic switching with energy-saving in priority (II), a flow chart of automatic switching with electrical safety in priority (I), a flow chart of automatic switching with electrical safety in priority (II) and a flow chart of automatic switching according to set time are shown. As illustrated, the aforesaid step (106) of setting of automatic switching according to the option of energy-saving in priority comprises the sub steps of:

(301) Start.

(302) Judge the power status parameter of the input power supply 2.

(303) Start counting the set time.

(304) Judge whether or not the setting of the power status parameter is changed. And then, proceed to sub step (317) if positive, or sub step (305) if negative.

(305) Judge whether or not the current setting value is the sensitivity of MEDIUM. And then, proceed to sub step (306) if positive, to sub step (310) if negative.

(306) Judge whether or not the power status parameter of the input power supply 2 is in the set range of the sensitivity of MEDIUM. And then proceed to sub step (307) if positive, or sub step (316) if negative.

(307) Judge whether or not the power status parameter of the input power supply 2 is in the set range of the sensitivity of HIGH. And then, proceed to sub step (308) if positive, or sub step (317) if negative.

(308) Judge whether or not the required count time is up. And then proceed to sub step (309) if positive, or sub step (318) if negative.

(309) Automatically switch the sensitivity to HIGH, and then proceed to sub step (317).

(310) Judge whether or not the current set value is the sensitivity of LOW. And then, proceed to sub step (311) if positive, or sub step (314).

(311) Judge whether or not the power status parameter of the input power supply 2 is in the set range of the sensitivity of MEDIUM. And then, proceed to sub step (312) if positive, or sub step (317) if negative.

(312) Judge whether or not the required count time is up. And then proceed to sub step (313) if positive, or sub step (318) if negative.

(313) Automatically switch the sensitivity to MEDIUM, and then, proceed to sub step (317). (314) Judge whether or not the power status parameter of the input power supply 2 is in the set range of the sensitivity of MEDIUM. And then, proceed to sub step (315) if positive, or sub step (316) if negative.

(315) Judge whether or not the power status parameter of the input power supply 2 is in the set range of the sensitivity of HIGH. And then, proceed to sub step (317) if positive, or sub step (313) if negative.

(316) Automatically switch the sensitivity to LOW, and then proceed to sub step (317).

(317) Reset the counting time to zero.

(318) End.

It is clear from the sub steps described above that the microcontroller 11 of the UPS system 1 can judge the power status parameter of the input power supply 2, and start counting the required count time. If the microcontroller 11 judges that the current sensitivity set value is MEDIUM and sequentially judges the power status parameter of the input power supply 2 is within the range of MEDIUM and the range of HIGH, the microcontroller 11 will keep counting time and will then automatically switch the sensitivity to HIGH and reset the counting time to zero when the time is up. If the microcontroller 11 judges the power status parameter of the input power supply 2 is not in conformity with the sensitivity set range of MEDIUM, the microcontroller 11 will automatically switch the sensitivity to LOW. If the microcontroller 11 judges that the current sensitivity set value is LOW and the power status parameter of the input power supply 2 is within the range of MEDIUM, the microcontroller 11 will keep counting time, and will then automatically switch the sensitivity to MEDIUM when the time is up. Further, if microcontroller 11 judges that the current sensitivity set value is not LOW and the power status parameter of the input power supply 2 is out of the range of MEDIUM, the microcontroller 11 will immediately switch the sensitivity to LOW. If microcontroller 11 judges that the power status parameter of the input power supply 2 is within the range of MEDIUM, the microcontroller 11 will judge whether or not the power status parameter of the input power supply 2 in the range of HIGH, and will immediately switch the sensitivity to MEDIUM if the power status parameter of the input power supply 2 is not in the range of HIGH. At final, the microcontroller 11 will reset the counting time to zero and then end the procedure, finishing the setting of switching according to the option of energy-saving in priority.

Further, the aforesaid step (107) of setting of automatic switching according to the option of electrical safety in priority comprises the sub steps of:

(401) Start.

(402) Judge the power status parameter of the input power supply 2.

(403) Set the demand value for the sensitivity state to be electrical safety.

(404) Start counting the required count time.

(405) Judge whether or not the setting of the power status parameter is changed. And then, proceed to sub step (419) if positive, or sub step (406) if negative.

(406) Judge whether or not the current state of the sensitivity is MEDIUM. And then, proceed to sub step (407) if positive, or sub step (412) if negative.

(407) Judge whether or not the power status parameter of the input power supply 2 is out of the set range of MEDIUM. And then proceed to sub step (411) if positive, or sub step (408) if negative.

(408) Judge whether or not the demanded sensitivity set value is MEDIUM. And then, proceed to sub step (420) if positive, or sub step (409).

(409) Judge whether or not the required count time is up. And then proceed to sub step (410) if positive, or sub step (420) if negative.

(410) Automatically switch the sensitivity to LOW, and then proceed to sub step (419).

(411) Automatically switch the sensitivity to HIGH, and then proceed to sub step (419).

(412) Judge whether or not the current sensitivity status is LOW. And then, proceed to sub step (413) if positive, or sub step (416) if negative.

(413) Judge whether or not the power status parameter of the input power supply 2 is out of the set range of the sensitivity of LOW. And then, proceed to sub step (415) if positive, or sub step (414) if negative.

(414) Judge whether or not the required count time is up. And then, proceed to sub step (419) if positive, or sub step (420) if negative.

(415) Automatically switch the sensitivity to MEDIUM, and then proceed to sub step (419).

(416) Judge whether or not the power status parameter of the input power supply 2 is out of the range of the sensitivity of HIGH. And then, proceed to sub step (419) if positive, or sub step (417) if negative.

(417) Judge whether or not the demanded sensitivity set value is HIGH. And then, proceed to sub step (419) if positive, or sub step (418).

(418) Judge whether or not the required count time is up. And then proceed to sub step (415) if positive, or sub step (420) if negative.

(419) Reset the counting time to zero.

(420) End.

It is clear from the sub steps described above that the microcontroller 11 of the UPS system 1 can judge the power status parameter of the input power supply 2, and set the demanded value for the sensitivity state to be electrical safety. After setting, the sensitivity state is automatically changed to the demanded value of electrical safety. Thereafter, the microcontroller 11 starts counting the required count time and then automatically switches the sensitivity when the required count time is up. If the microcontroller 11 judges that the current status of the power status parameter of the input power supply 2 is out of the set range, the microcontroller 11 will immediately switch the sensitivity setting to HIGH. If the microcontroller 11 judges that the current status of the power status parameter of the input power supply 2 is in the set range of MEDIUM and the demanded sensitivity set value it not MEDIUM, the microcontroller 11 will keep counting time, and will automatically switch the sensitivity to LOW when the required count time is up. If the microcontroller 11 judges that the current state is LOW and the power status parameter of the input power supply 2 is out of the range of the sensitivity of LOW, the microcontroller 11 will automatically switch the sensitivity to MEDIUM. If the microcontroller 11 judges that the current state is neither MEDIUM nor LOW, and the power status parameter of the input power supply 2 is within the range of the sensitivity of HIGH, the microcontroller 11 will then judge whether or not the demanded set value to be the sensitivity of HIGH. If the demanded set value is not the sensitivity of HIGH, the microcontroller 11 will automatically switch the sensitivity to MEDIUM when the required count time is up. Thereafter, the microcontroller 11 will reset the counting time to zero and then end the procedure, finishing the setting of switching according to the option of electrical safety in priority.

Further, the aforesaid step (108) of setting of automatic switching according to the option of setting time in priority comprises the sub steps of:

(501) Start.

(502) Judge the power status parameter of the input power supply 2.

(503) Start counting the setting time.

(504) Judge whether or not the power status and parameter setting of action time range is changed. And then, proceed to sub step (512) if positive, or sub step (505) if negative.

(505) Judge whether or not it enters the action time range of the sensitivity of HIGH. And then, proceed to sub step (506) if positive, or sub step (507) if negative.

(506) Automatically switch the setting of sensitivity to HIGH, and then proceed to sub step (512).

(507) Judge whether or not it enters the action time range of the sensitivity of MEDIUM. And then, proceed to sub step (508) if positive, or sub step (509) if negative.

(508) Automatically switch the setting of sensitivity to MEDIUM, and then proceed to sub step (512).

(509) Judge whether or not it enters the action time range of the sensitivity of LOW. And then, proceed to sub step (510) if positive, or sub step (511) if negative.

(510) Automatically switch the setting of sensitivity to LOW, and then proceed to sub step (512).

(511) Judge whether or not the counting of the setting time is completed. And then, proceed to sub step (512) if positive, or sub step (513) if negative.

(512) Reset the counting time to zero.

(513) End.

It is clear from the sub steps described above that the microcontroller 11 of the UPS system 1 can judge the power status parameter of the input power supply 2, and then start counting the setting time. If the microcontroller 11 judges that the power status parameter of the input power supply 2 enters the action time range of the sensitivity of HIGH, the microcontroller 11 will automatically switch the setting of sensitivity to HIGH. If the microcontroller 11 judges that the power status parameter of the input power supply 2 does not enter the action time range of the sensitivity of HIGH, the microcontroller 11 will then judge whether or not the power status parameter of the input power supply 2 enters the action time range of the sensitivity of MEDIUM. If the power status parameter of the input power supply 2 enters the action time range of the sensitivity of MEDIUM, the microcontroller 11 will automatically switch the setting of sensitivity to MEDIUM. If the power status parameter of the input power supply 2 enters the action time range of the sensitivity of MEDIUM at this time, the microcontroller 11 will judge whether or not the power status parameter of the input power supply 2 enter the action time range of the sensitivity of LOW. If the power status parameter of the input power supply 2 enters the action time range action time range of the sensitivity of LOW at this time, the microcontroller 11 will automatically switch the setting of sensitivity to LOW. Thereafter, the microcontroller 11 will reset the counting time to zero and then end the procedure, finishing the setting of switching according to the option of set time in priority.

In conclusion, the sensitivity of power status parameter adjustment setting method of the present invention allows the microcontroller 11 of the UPS system 1 to set the setting manually or according to the system default value when the quality of the input power supply 2 is good. The microcontroller 11 of the UPS system 1 can automatically switch the sensitivity to HIGH to enhance power protection if the power status of the input power supply 2 is judged in the range set according to option of energy-saving, electrical safety or set time in priority after counting of the set time is completed. If a power generator of a relatively lower power quality level is used for the input power supply 2, the microcontroller 11 can automatically switch the sensitivity to LOW subject to the option of energy-saving in priority and employ a low-sensitivity detection of power judgment, maintaining the USP system 1 in the normal mode without being changed to the battery mode, i.e., the microcontroller 11 will not control the first transfer switch 13 to switch to the DC-to-AC inverter 12 for converting the output power of the stored energy systems 14 into AC power supply for output to the loads 3, preventing system shutdown due to complete discharge of the stored energy systems 14, and thus, the UPS system 1 can operate normally, and the supply of the power of the stored energy systems to the load 3 can be prolonged and well protected.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A UPS sensitivity of power status parameter adjustment setting method used in a UPS (Uninterruptible Power Supply) system having a power input end thereof connected to an input power supply and a power output end thereof connected to at least one load, said USP system comprising a microcontroller, a DC-to-AC inverter electrically coupled to said microcontroller, a first transfer switch electrically connected to said microcontroller and electrically coupled with said DC-to-AC inverter, said input power supply and said at least one load and a stored energy systems electrically coupled to said DC-to-AC inverter, said microcontroller controlling said first transfer switch to switch to a bypass for enabling said input power supply to be directly outputted to said at least one load when said UPS system is in an energy-saving mode, and thus, this operating mode can effectively reduce power loss, said microcontroller controlling said first transfer switch to switch to said DC-to-AC inverter to let the power supply of said stored energy systems to be converted into AC power supply for output to said at least one load when an abnormal state occurs, the UPS sensitivity of power status parameter adjustment setting method comprising the steps of:

(a01) start;

(a02) setting the sensitivity of power status parameter;

(a03) judging if to automatically adjust the sensitivity, and then proceeding to step (a04) if positive, or step (a09) if negative;

(a04) setting data judgment and time range, and storing data specification settings;

(a05) selecting the function, and then proceeding to step (a06) if energy-saving in priority is selected, step (a07) if electrical safety in priority is selected, or step (a08) if the option of switching the function according to the set time is selected;

(a06) the option of energy-saving in priority being selected; thus, conducting judgment of the power status parameter of said input power supply, and then automatically switching the sensitivity to HIGH, MEDIUM or LOW subject to the judgment result, and then returning to step (a01);

(a07) the option of electrical safety in priority being selected; conducting judgment of the power status parameter of said input power supply, and then setting the desired value for the electrical safety sensitivity, and then automatically switching the sensitivity to HIGH, MEDIUM or LOW subject to the judgment result, and then returning to step (a01);

(a08) the option of switching the function according to the set time being selected; conducting judgment of the power status parameter of said input power supply and setting the operating time range of HIGH, MEDIUM and LOW sensitivity, and then switching the sensitivity to HIGH, MEDIUM or LOW subject to the judgment result, and then returning to step (a01);

(a09) manually switching the sensitivity to HIGH, MEDIUM or LOW; and (a10) ending the procedure.

2. The UPS sensitivity of power status parameter adjustment setting method as claimed in claim 1, wherein said UPS system further comprises a second transfer switch electrically coupled to said microcontroller, said first transfer switch and said input power supply, and an automatic voltage regulator electrically connected to said second transfer switch and electrically coupled to said input power supply.

3. The UPS sensitivity of power status parameter adjustment setting method as claimed in claim 1, wherein said UPS system further comprises an AC-to-DC rectifier electrically coupled to said stored energy systems said input power supply.

4. The UPS sensitivity of power status parameter adjustment setting method as claimed in claim 1, wherein step (a02) of the sensitivity of power status parameter setting method for setting the sensitivity of power status parameter comprises the sub steps of:

(b01) starting;

(b02) selecting the sensitivity of power status parameter setting mode, and then proceeding to sub step (b03) if manual setting is selected, or sub step (b05) if setting according to system default value is selected;

(b03) the user manually setting the sensitivity of the power status parameter for HIGH, MEDIUM or LOW;

(b04) inputting the value for at least one of the parameters of input voltage, input frequency, harmonic distortion, voltage change rate, frequency change rate, surge or noise, and then proceeding to sub step (b06);

(b05) setting the sensitivity according to the system default value; and (b06) ending the procedure.

5. The UPS sensitivity of power status parameter adjustment setting method as claimed in claim 1, wherein the data judgment and time range to be set in step (a04) is selectively to be 30 minutes, 60 minutes, 12 hours, one day or one week.

6. The UPS sensitivity of power status parameter adjustment setting method as claimed in claim 1, wherein step (a06) of setting of automatic switching according to the option of energy-saving in priority comprises the sub steps of:

(c01) starting'

(c02) judge the power status parameter of said input power supply;

(c03) starting to count the required count time;

(c04) judging that the setting of the power status parameter is changed or not, and then proceeding to sub step (c17) if positive, or sub step (c05) if negative;

(c05) judging that the current setting value is the sensitivity of MEDIUM or not, and the proceeding to sub step (c06) if positive, to sub step (c10) if negative;

(c06) judging that the power status parameter of said input power supply is in the set range of the sensitivity of MEDIUM or not, and then proceeding to sub step (c07) if positive, or sub step (c16) if negative;

(c07) judging the power status parameter of said input power supply is in the set range of the sensitivity of HIGH or not, and then proceeding to sub step (c08) if positive, or sub step (c17) if negative;

(c08) judging that the set time is up or not, and then proceeding to sub step (c09) if positive, or sub step (c18) if negative;

(c09) automatically switching the sensitivity to HIGH, and then proceeding to sub step (c17);

(c10) judging that the current set value is the sensitivity of LOW or not, and then proceeding to sub step (c11) if positive, or sub step (c14);

(c11) judging the power status parameter of the input power supply is in the set range of the sensitivity of MEDIUM or not, and then proceeding to sub step (c12) if positive, or sub step (c17) if negative;

(c12) judging that the required counting time is up or not, and then proceeding to sub step (c13) if positive, or sub step (c18) if negative;

(c13) automatically switching the sensitivity to MEDIUM, and then proceeding to sub step (c17);

(c14) judging that the power status parameter of said input power supply is in the set range of the sensitivity of MEDIUM or not, and then proceeding to sub step (c15) if positive, or sub step (c16) if negative;

(c15) judging that the power status parameter of the input power supply is in the set range of the sensitivity of HIGH or not, and then proceeding to sub step (c17) if positive, or sub step (c13) if negative;

(c16) automatically switching the sensitivity to LOW, and then proceeding to sub step (c17);

(c17) resetting the counting time to zero; and (c18) ending the procedure.

7. The UPS sensitivity of power status parameter adjustment setting method as claimed in claim 1, wherein step (a07) for the setting of automatic switching according to the option of electrical safety in priority comprises the sub steps of:
- (d01) starting;
- (d02) judge the power status parameter of said input power supply;
- (d03) setting the demand value for the sensitivity state to be electrical safety;
- (d04) starting to count the required time;
- (d05) judging that the setting of the power status parameter is changed or not, and then proceeding to sub step (d19) if positive, or sub step (d06) if negative;
- (d06) judging that the current state of the sensitivity is MEDIUM or not, and then proceeding to sub step (d07) if positive, or sub step (d12) if negative;
- (d07) judging that the power status parameter of said input power supply is in out of the set range of MEDIUM or not, and then proceeding to sub step (d11) if positive, or sub step (d08) if negative;
- (d08) judging that the demanded sensitivity set value is MEDIUM or not, and then proceeding to sub step (d20) if positive, or sub step (d09);
- (d09) judging that the required count time is up or not, and then proceeding to sub step (d10) if positive, or sub step (d20) if negative;
- (d10) automatically switching the sensitivity to LOW, and then proceeding to sub step (d19);
- (d11) automatically switching the sensitivity to HIGH, and then proceeding to sub step (d19);
- (d12) judging that the current sensitivity status is LOW or not, and then, proceeding to sub step (d13) if positive, or sub step (d16) if negative;
- (d13) judging that the power status parameter of said input power supply is out of the set range of the sensitivity of LOW or not, and then, proceeding to sub step (d15) if positive, or sub step (d14) if negative;
- (d14) judging that the required count time is up or not and then, proceeding to sub step (d19) if positive, or sub step (d20) if negative;
- (d15) automatically switching the sensitivity to MEDIUM, and then proceeding to sub step (d19);
- (d16) judging that the power status parameter of said input power supply is out of the range of the sensitivity of HIGH or not, and then, proceeding to sub step (d19) if positive, or sub step (d17) if negative;
- (d17) judging that the demanded sensitivity set value is HIGH or not, and then proceeding to sub step (d19) if positive, or sub step (d18);
- (d18) judging that the required count time is up or not and then proceeding to sub step (d15) if positive, or sub step (d20) if negative;
- (d19) resetting the counting time to zero; and
- (d20) ending the procedure.

8. The UPS sensitivity of power status parameter adjustment setting method as claimed in claim 1, wherein step (a08) for the setting of automatic switching according to the option of set time in priority comprises the sub steps of:
- (e01) starting;
- (e02) judging the power status parameter of said input power supply;
- (e03) starting to count the set time;
- (e04) judging that the power status and parameter setting of action time range is changed or not, and then, proceeding to sub step (e12) if positive, or sub step (e05) if negative;
- (e05) judge that the power status enters the action time range of the sensitivity of HIGH or not, and then, proceeding to sub step (e06) if positive, or sub step (e07) if negative;
- (e06) automatically switching the setting of sensitivity to HIGH, and then proceeding to sub step (e12);
- (e07) judging that the power status enters the action time range of the sensitivity of MEDIUM or not, and then, proceeding to sub step (e08) if positive, or sub step (e09) if negative;
- (e08) automatically switching the setting of sensitivity to MEDIUM, and then proceeding to sub step (e12);
- (e09) judging that the power status enters the action time range of the sensitivity of LOW or not, and then, proceeding to sub step (e10) if positive, or sub step (e11) if negative;
- (e10) automatically switching the setting of sensitivity to LOW, and then proceeding to sub step (e12);
- (e11) judging that the counting of the set time is completed or not, and then proceeding to sub step (e12) if positive, or sub step (e13) if negative;
- (e12) resetting the counting time to zero;
- (e13) ending the procedure.

* * * * *